April 14, 1953  W. JACKSON, JR., ET AL  2,634,908
INFRARED COMPUTING RECORDER
Filed April 1, 1950
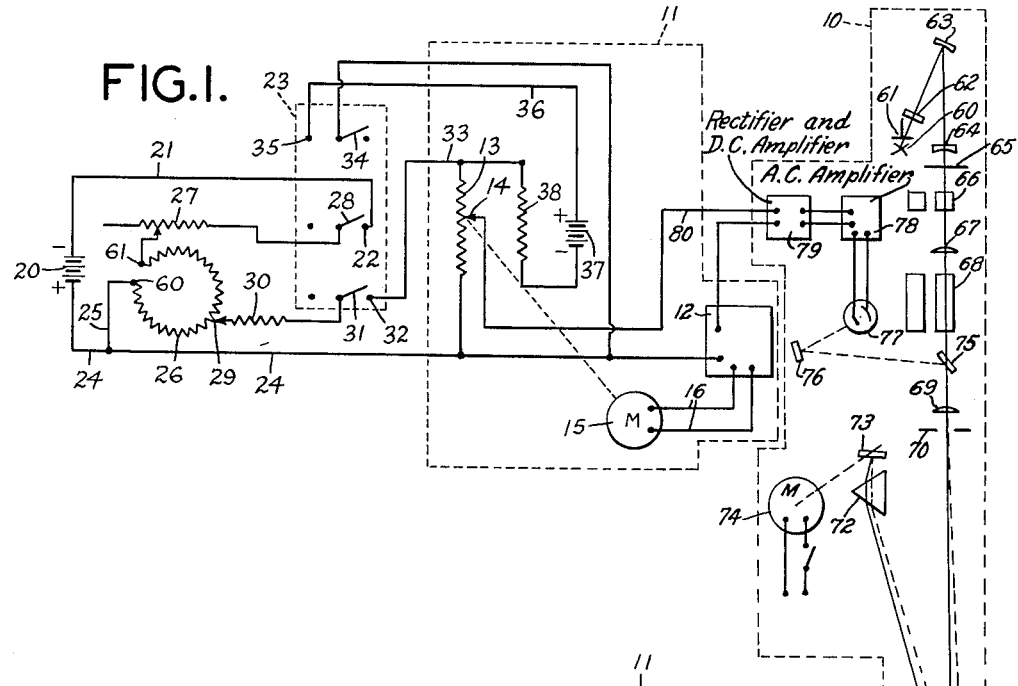
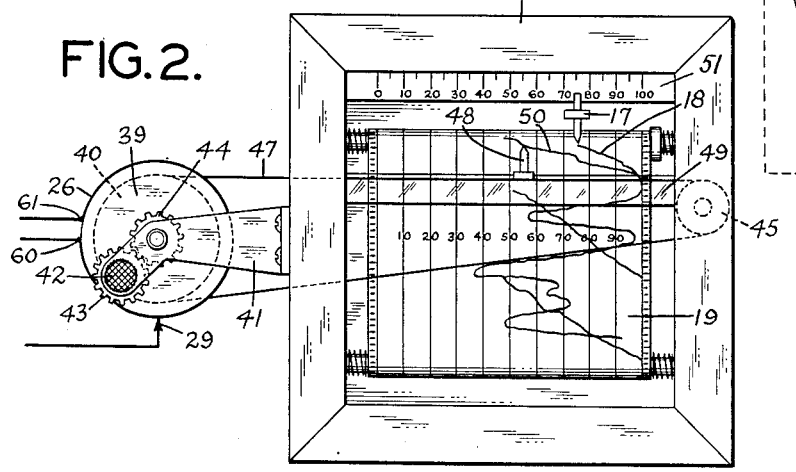
INVENTORS.
WARREN JACKSON, JR.
ROBERT W. FOREMAN
BY
Campbell, Brumbaugh, Free & Graves
THEIR ATTORNEYS.

Patented Apr. 14, 1953

2,634,908

UNITED STATES PATENT OFFICE 2,634,908

INFRARED COMPUTING RECORDER

Warren Jackson, Jr., East Cleveland, and Robert W. Foreman, Cleveland, Ohio, assignors to The Standard Oil Company, Cleveland, Ohio, a corporation of Ohio Application April 1, 1950, Serial No. 153,446

7 Claims. (Cl. 235—61)

The present invention relates to computers and more particularly to new and improved computing apparatus for determining the ratio between two quantities, either or both of which may be variables. More specifically, it has to do with new and improved computing apparatus for recording values such as the percentage transmission of radiant energy through a sample substance over a selected range of wave lengths, for example, although it is not limited to such use.

In quantitative analysis, a determination of the infrared absorption data of a sample is often required. Usually, such data are expressed in terms of the percentage transmission of infrared radiation through the sample over a specified range of wave lengths. With the single beam type of recording infrared spectrophotometer, it is customary to record first the transmission curve for an empty blank cell and then to record the curve for a cell filled with a sample over the same range of wave lengths. The ratio of the transmission through the sample cell to that through the blank cell times 100 is the percent transmission through the sample alone.

The point-by-point computation of the ratio at each wave length for which a percentage transmission value is desired is a tedious and slow procedure. For this reason, semi-automatic means have been devised for computing percentage transmission values. In one device of this type, percentage transmission curves for the empty cell and for the cell filled with a sample are recorded on the same chart. The chart is then placed in another instrument and the curves are traced simultaneously by hand with two pointers placed on a single track. At each wave length, one of the pointers selects a voltage proportional to the percentage transmission for the empty cell and applies it to the other pointer which impresses it across a resistance proportional to the percentage transmission for the cell filled with the sample. The current then flowing in the resistor is directly proportional to the percentage transmission for the sample alone.

While the foregoing semi-automatic apparatus eliminates the necessity for point-by-point computation, it requires considerable ambidexterity for operation, in that the blank and the sample curves must be followed simultaneously by manually operated pointers while the recorder chart is in motion.

It is an object of the invention, accordingly, to provide new and improved ratio or percentage determining computer apparatus which is rapid yet simple and highly effective in operation.

Another object of the invention is to provide new and improved computer apparatus of the above character which obviates the need for manually tracing simultaneously two curves representing values of the two quantities entering into the ratio to be determined.

A further object of the invention is to provide new and improved computer apparatus in which the percentage transmission of radiant energy through a sample over a specified range of wave lengths may be determined while the same is being examined by a spectrophotometer or the like for the first time.

Still another object of the invention is to provide new and improved computer apparatus which may be combined with spectrophotometric apparatus or the like in such fashion as to permit operation of the latter either normally or in conjunction with the computer apparatus as desired.

These and other objects are attained in the determination of infrared absorption data, for example, by first recording on a chart a curve of percentage transmission through the blank cell. The chart is then turned back to its starting position and the recording of the curve of the percentage transmission through the cell filled with the sample is begun. Simultaneously, the blank cell transmission curve is traced with a manually operated pointer. The movements of the pointer produce corresponding variations in the magnitude of a voltage which energizes a self-balancing potentiometer device. The potentiometer slider is automatically adjusted so that the voltage output therefrom is always equal to the value of voltage corresponding to the sample filled cell percentage transmission at every instant. The curve recorded on the chart by a marking device linked to the potentiometer slider is, therefore, a curve of the percentage transmission through the sample alone.

The invention may be better understood from the following detailed description of a representative embodiment, taken in conjunction with the accompanying drawings, in which:

Fig. 1 is a schematic diagram of an electrical computer circuit constructed according to the present invention; and Fig. 2 illustrates mechanical details of part of the recorder apparatus used in the circuit of Fig. 1.

While the computer of the invention may be adapted for a wide variety of uses, it will be described herein, by way of example, as applied to the determination of the percentage transmission of infrared radiation through a sample over a specified range of wave lengths.

As shown in Fig. 1, typical computer apparatus for determining the infrared spectra of a sample in quantitative analysis may comprise a suitable infrared spectrophotometer 10 such as the Beckman model IR-2, for example, and a self-balancing potentiometer 11 of conventional type. The potentiometer 11 may comprise, for example, a resistance wire 13 engaged by a slider 14 driven by a motor 15. The motor 15 is energized by a suitable amplifier 12 through the conductors 16. The slider 14 carries an inking pen 17 (Fig. 2) which is adapted to record a trace 18 on a chart 19 mounted on suitable rollers in the recorder 11.

The construction of the spectrophotometer 10 is well known and it will be necessary to describe it only briefly. As shown in Fig. 1, light from a Nernst glower 60 is interrupted say ten times a second by a rotating shutter 61, passes through a rock salt window 62 and is focussed by a condensing mirror 63, forming an image of the source in the focal plane of a concave rock salt lens 64. The collimated beam passes through a filter slide and shutter 65 and a liquid cell compartment 66. A lens 67 converges the beam through a gas cell compartment 68 and a lens 69, forming an image of the source on an upper entrance slit in a diaphragm 70. Light from the slit in the diaphragm 70 is collimated by a spherical mirror 71 and dispersed by a prism 72 from which it passes to a rotatable Littrow mirror 73 which is adapted to be rotated by a motor 74 for automatic continuous spectral scanning. Light reflected by the rotatable mirror 73 is dispersed a second time by the prism 72 and focussed by the lens 71 on the plane of an exit slit in the diaphragm 70, which lies just below the entrance slit therein. The beam is directed by a plane mirror 75 against a condensing mirror 76 which focusses an image of the exit slit on a photosensitive device 77. The output of the photosensitive device 77 passes through an A. C. amplifier 78 and a rectifier and D. C. amplifier 79, one terminal of which is connected by a conductor 80 to the slider 14 on the resistance wire 13. The other terminal of the rectifier and amplifier 79 is connected to one terminal of the amplifier 12, the other terminal of which is connected by a conductor 82 to the lower end of the resistance 13.

When the motor 74 in the spectrophotometer 10 is energized, it rotates the mirror 73 causing adjacent portions of the radiant energy spectrum in the beam of light passing through either the liquid cell compartment 66 or the gas cell compartment 68 to impinge successively on the photosensitive device 77. This produces an output at the terminals of the rectifier and amplifier 79 which is a function of the radiant energy transmission at adjacent points in the spectrum through liquid or gas contained in the compartment 66 or 68, respectively.

The voltage input to the amplifier 12 is the difference between the potential at the slider 14 with respect to the conductor 24 and the voltage output from the spectrophotometer 10. As is well known in the art, if the resultant potential difference in the input circuit to the amplifier 12 is zero, the motor 15 remains at rest. However, if the resultant potential difference is not zero, but has a positive or negative value, the motor 15 is energized and moves the slider 14 in the proper direction to reduce that potential difference to zero.

According to the invention, the voltage applied to the resistance wire 13 in the recorder 11 is adapted to be adjusted manually to be proportional to the percentage transmission through the blank cell over the same range of wave lengths as for the sample curve. A typical electrical circuit for accomplishing this result comprises a source of constant voltage such as a battery 20, for example, one terminal of which is connected by a conductor 21 to a terminal 22 on a triple-pole double-throw switch 23 of conventional type, and the other terminal of which is connected by the conductors 24 and 25 to one terminal 60 of a precision resistor 26. The other terminal 61 of the resistor 26 is connected in series with a variable resistance 27 to a switch blade 28 on the switch 23.

The precision resistor 26 is engaged by a contact 29 which is connected in series with a resistor 30 to a switch blade 31 on the switch 23. The switch blade 31 is adapted to engage a contact 32 which is connected by a conductor 33 to one terminal of the resistance 13 in the recorder 11, the other terminal of which is connected by the conductors 24 and 25 to the terminal 60 of the precision resistor 26.

The switch 23 also carries a switch blade 34 which is adapted to engage a contact 35 connected by a conductor 36 in series with a suitable source of voltage such as a dry cell 37 and a resistor 38 to the conductor 33.

From the foregoing, it will be understood that when the switch 23 is thrown to the left-hand position, the resistor 13 in the recorder 11 will be energized by the dry cell 37 through the resistor 38. The switch 23 is thrown to this position when it is desired to record percentage transmission curves in the usual manner. However, when the switch 23 is thrown to the right-hand position, the resistor 13 in the recorder 11 is energized by a manually adjustable voltage from the precision resistor 26.

Mechanism suitable for manually adjusting the resistor 26 relatively to the contact 29 is shown in greater detail in Fig. 2. The precision resistor 26 is mounted on a disc-like member 39 carried by a pulley 40 mounted on a bracket 41 secured to the casing of the recorder 11. The disc-like member 39 is adapted to be rotated by means of a knob 42 mounted on the bracket 41 which carries a gear 43 engaging a gear 44 mounted on the disc-like member 39.

Mounted on the pulley 40 and on an idler pulley 45 secured on the recorder casing is a continuous belt or cord 47 to which is secured a pointer 48 slidably mounted on the usual glass tear strip 49 on the recorder 11. It will be understood that by adjusting the knob 42, the pointer 48 may be moved from side to side as required to follow a curve 50 on the chart 19 while the latter is in motion.

In a practical computer constructed in accordance with the invention, the following values may be used for the elements of the adjustable voltage source for the recorder resistor 13:

Battery 20—6 volts
Resistor 26—20 ohms
Resistor 27—20 ohms
Resistor 30—1,000 ohms Initially, the variable resistance 27 (Fig. 1) is adjusted to apply to the recorder resistor 13 a voltage such that when the pointer 48 (Fig. 2) is set at "100" on the recorder scale 51, the pen 17 will record the same percentage transmission as is indicated by the dial on the spectrophotometer 10. With the blank cell in the light path of the spectrophotometer 10, initial wave length and slit-width settings are chosen and the gain of the amplifier 12 is adjusted to give a reading of 100% transmission.

In operation, the switch 23 is first thrown to the left. The recorder drive and the wave length drive of the spectrophotometer 10 are then started simultaneously. For best results, it is preferable to start the wave length drive at a value previous to those to be recorder and the recorder should be turned on when the starting wave length is reached. The recording of the blank transmission curve 50 on the chart 19 is then allowed to proceed until the percentage transmission has decreased to approximately 50%. The wave length drive of the spectrophotometer 10 is then disengaged and is reset at its original value. At this time, the spectrophotometer 10 may be checked by means of the usual null indicator for drift which in most cases will be negligible.

The recorder chart 19 is then rolled back to a wave length position slightly outside of the range to be recorded. A recorder pen 17 containing ink of a different color from that used to record the blank curve 50 is installed. The manually operated pointer 48 is then adjusted to the "100" position on the recorder chart scale 51 and the switch 23 is thrown to the right. The calibrating variable resistance 27 is now adjusted until the recorder pen 17 also indicates "100" on the scale 51. The pen 17 should now give the same reading for either position of the switch 23.

With the switch 23 thrown to the right and the sample cell in the light path of the spectrophotometer 10, the recorder 11 is started simultaneously with the wave length drive at the same starting position on the chart 19 as was used for the blank curve 50. Meanwhile, the curve 50 for the blank cell is followed closely with the pointer 48 by manual operation of the adjusting knob 42. The recording pen 17 then automatically traces a curve 18 which represents the percentage transmission for the sample alone.

The invention thus provides novel and highly effective apparatus for computing the percentage transmission of infrared radiation, or the like, through a sample. By manually adjusting the voltage applied to the resistor 13 in the recorder 11, as a function of the blank transmission curve, while the sample transmission curve is being run, the desired percentage transmission curve for the sample alone can be obtained quickly and easily. Since only one curve must be followed manually, the apparatus is easy to operate and it is less expensive than computer apparatus of the type employed previously.

It will be understood that the invention is not limited to the determination of the percentage transmission of infrared radiation through a sample, as described in the specific embodiment illustrated herein. On the contrary, it may be employed generally for determining ratios between variables, or percentages, as will be apparent to those skilled in the art.

The specific embodiment disclosed herein is obviously susceptible of modification within the spirit of the invention, and it is not to be regarded as imposing any limitations whatsoever upon the scope of the following claims.

I claim:

1. In computer apparatus, the combination of a chart, means for moving said chart in one direction as a function of one variable, self-balancing potentiometer means having an adjustable voltage divider the output voltage from which is balanced against a voltage representative of another variable, guide means providing ways extending in another direction, pointer means movably mounted on said ways and disposed so a to be moved to follow a recorded curve on said chart while the latter is in motion, a pair of spaced apart pulleys, a continuous belt mounted on said pulleys and connected to said pointer means for moving the same, substantially circular resistance means carried by one of said pulleys and engaged by a fixed contact, a source of electrical energy connected to the terminals of said resistance means, electric circuit means connecting said contact to said voltage divider for energizing the same, and means for recording a curve on said chart corresponding to the adjustment of said voltage divider.

2. In computer apparatus, the combination of a chart, means for moving said chart in one direction as a function of one variable, self-balancing potentiometer means having an adjustable voltage divider the output voltage from which is balanced against a voltage representative of another variable, guide means providing ways extending in another direction, pointer means movably mounted on said ways and disposed so as to be moved to follow a recorded curve on said chart while the latter is in motion, a pair of spaced apart pulleys, a continuous belt mounted on said pulleys and connected to said pointer means for moving the same, substantially circular resistance means carried by one of said pulleys and engaged by a fixed contact, a source of electrical energy connected to the terminals of said resistance means, electric circuit means connecting said contact to said voltage divider for energizing the same, a second electrical energy source of constant voltage, switching means for energizing said voltage divider selectively from said contact or from said second electrical energy source, and means for recording a curve on said chart corresponding to the adjustment of said voltage divider.

3. In computer apparatus, the combination of a chart, means for moving said chart in one direction as a function of one variable, electrical potentiometer means having a first adjustable voltage divider the output voltage from which is balanced against a voltage representative of a second variable, means operable by said potentiometer means for recording a curve on said chart representing the adjustment of said first voltage divider, pointer means movably mounted with respect to said chart, manually operable means for adjusting the position of said pointer means with respect to the chart, a second voltage divider means adjustable by said manually operable means, a source of electrical energy connected to said second voltage divider means, and electrical connections between said second voltage divider means and said first voltage divider for energizing the same.

4. In computer apparatus, the combination of a chart, means for moving said chart in one direction as a function of one variable, electrical potentiometer means having as a first adjustable voltage divider the output voltage from which is balanced against a voltage representative of another variable, means movable in another direction and operable by said first voltage divider for recording a curve on said chart, guide means providing ways extending in said another direction, pointer means movably mounted on said ways and disposed so as to be moved to follow a recorded curve on said chart while the latter is in motion, manually operable means for moving said pointer means along the ways, a second voltage divider having a contact thereon, a source of electrical energy for said second voltage divider, means actuated by said manually operable means for producing relative engaging movement between said second voltage divider and the contact thereon, and circuit means connecting said contact to said first voltage divider to energize the latter.

5. In computer apparatus, the combination of a chart having two coordinates, means for moving said chart along one coordinate as a function of an independent variable, pointer means manually movable along the second coordinate, a first voltage controlling means coupled to said pointer means for producing a first voltage representing the position of the pointer on said chart, a second voltage controlling means for producing a second voltage proportional to said first voltage, means for varying the proportion of said second voltage to said first voltage to substantially balance a voltage representing a dependent variable quantity, and means coupled to said second voltage controlling means for recording a curve on said chart corresponding to the ratio between the voltages representing said dependent variable quantity and the position of the pointer.

6. In computer apparatus, the combination of a chart having two coordinates, means for moving said chart along one coordinate as a function of an independent variable, pointer means manually movable along the second coordinate of said chart, a first voltage divider having a reference potential impressed thereon and coupled to said pointer means for adjustment therewith, a second voltage divider having a variable voltage from said first voltage divider impressed thereon, motive means responsive to a voltage difference between the voltage from said second voltage divider and a voltage representing a dependent variable quantity for so adjusting said second voltage divider as to maintain the voltage difference substantially at zero, and means coupled to said second voltage divider for recording a curve on said chart as a function of the position of said pointer means and the dependent variable.

7. In computer apparatus, the combination of a chart having two coordinates, means for moving said chart along one coordinate as a function of an independent variable, pointer means manually movable along the second coordinate of said chart, a first voltage divider having a reference potential impressed thereon and coupled to said pointer means for adjustment therewith, a second voltage divider having a variable voltage from said first voltage divider impressed thereon, an amplifier having an input signal supplied thereto corresponding to the voltage from said second voltage divider and a voltage representing a dependent variable quantity, a motor responsive to the amplitude and polarity of the amplifier output signal for so adjusting said second voltage divider that the input signal is maintained substantially at zero, and means coupled to said second voltage divider for recording a curve on said chart as a function of the position of said pointer means and the dependent variable.

WARREN JACKSON, Jr.
ROBERT W. FOREMAN.

References Cited in the file of this patent

UNITED STATES PATENTS

| Number | Name | Date |
|---|---|---|
| 2,045,438 | Cioffi | June 23, 1936 |
| 2,212,799 | Sperry | Aug. 27, 1940 |
| 2,232,086 | Van Den Akker | Feb. 18, 1941 |
| 2,262,354 | Oates | Nov. 11, 1941 |

OTHER REFERENCES

Publication Journal Optical Society of America, Sept. 1939, "A mechanical integrator for evaluating the integral of the product of two functions and its application to the computation of I. C. I. color specifications from spectrophotometric curves," by J. A. Van Den Akker, pages 364–369.